United States Patent

[11] 3,601,079

| [72] | Inventors | Walter B. Giles;<br>William T. Pettit, III, both of Scotia, N.Y. |
|---|---|---|
| [21] | Appl. No. | 869,314 |
| [22] | Filed | Oct. 24, 1969 |
| [45] | Patented | Aug. 24, 1971 |
| [73] | Assignee | General Electric Company<br>Continuation-in-part of application Ser. No. 786,510, Aug. 2, 1968, which is a continuation-in-part of application Ser. No. 642,961, June 1, 1967, now abandoned. |

[54] METHOD AND APPARATUS FOR APPLYING DRAG-REDUCING ADDITIVES
7 Claims, 4 Drawing Figs.

| [52] | U.S. Cl. | 114/67 |
|---|---|---|
| [51] | Int. Cl. | B63b 1/34 |
| [50] | Field of Search | 114/67.1, 67 |

[56] References Cited
UNITED STATES PATENTS

| 2,954,750 | 10/1960 | Crump et al. | 114/67 X |
|---|---|---|---|
| 3,286,674 | 11/1966 | Thompson et al. | 114/67 |

*Primary Examiner*—Andrew H. Farrell
*Attorneys*—Frank L. Neuhauser, Joseph B. Forman, Oscar B. Waddell, Francis K. Richwine and Carl W. Baker ABSTRACT: A water-soluble polymeric material is mixed with water rapidly in the mixing chamber. In the mixing chamber polymer and water are thoroughly mixed at a high velocity of water to produce turbulence whereupon the mixed solution passes from the mixing chamber to a hydration tank where it is hydrated dynamically to provide a uniform polymer solution. From the hydration tank the hydrated polymer is diluted with bypass flow to a desired concentration for injection or it may be injected directly into the main flow of water which may be along the sides of a conduit or along the sides of a moving vessel.

Patented Aug. 24, 1971

Inventors:
Walter B. Giles,
William T. Pettit, III
by Julius J. Zaskalicky
Their Attorney.

METHOD AND APPARATUS FOR APPLYING DRAG-REDUCING ADDITIVES

This application is a continuation-in-part of our copending application entitled "Suspension Techniques for Easy Mixing of Water-Soluble Polymeric Friction Reduction Additives," Ser. No. 786,510, filed Aug. 2, 1968 which latter application is a continuation-in-part of an earlier filed copending application entitled "Suspension Techniques for Easing Mixing of Water-soluble Polymeric Friction Reduction Additives," Ser. No. 642,961, filed June 1, 1967, and now abandoned.

Our invention relates to a method and system for mixing soluble polymeric materials with a liquid and particularly for the easy and effective mixing with a liquid solvent of soluble materials to provide improved drag-reducing solutions which can be prepared on a continuous basis.

This invention provides a method and system for fully developing the drag-reducing properties of a polymer solution in order to achieve optimum friction reduction upon injection into a liquid flowing relative to the injection point. These additives are hydrated and upon injection are used for applications such as shown in the following patents titled "Drag Reduction in Hydraulic Equipment," U.S. Pat. No. 3,290,883, "Additive Drag Reduction with Recirculation," U.S. Pat. No. 3,303,810 and "Method and Apparatus for Drag Reduction," U.S. Pat. No. 3,303,811 all granted to Walter B. Giles and assigned to the assignee of this invention. Our method and system can be used for any other applications in which a high molecular weight, linear chained molecule is to be suspended in the solution for later use.

It is an object of our invention to provide a method and means for mixing an additive with a liquid and injecting the mixture into a boundary layer to reduce friction between the liquid of the boundary layer and the surface which is moving relative to the liquid. An important object of our invention is a method and means for marine applications to rapidly mix water and polymer additive so that the polymer is hydrated effectively just prior to the time it is injected along the surface which is to be lubricated or along which friction is to be reduced.

It has been discovered that enough time must be allowed during the hydration period to produce a uniform solution of substantially all the polymer additive present in the mixture. An insufficient time period for hydration does not fully develop the drag-reducing properties of the product which results in significantly less friction reduction upon premature injection into the boundary layer, or excessive polymer must be used. From this discovery it follows that an inefficient use of the drag-reducing additives is obtained when the time period allowed for hydration is too short. The general problem is of even greater significance in those applications for drag reduction wherein space and weight limitations apply to the apparatus needed as well as to the drag-reducing composition. In such applications it becomes desirable to produce the final product continuously and effectively in situ from a minimum stored supply of the drag-reducing additive by means which mixes therewith a liquid solvent obtained from the ambient environment. The emphasis placed upon weight and size savings in such systems has not heretofore provided sufficient hydration at the flow rates needed for drag reduction.

Other problems also arise when mixing a polymeric drag-reducing additive continuously in situ to produce an effective product for injection into the boundary layer as formed. Effective additives are very high molecular weight polymers which afford an advantage of lowest concentration requirements for a comparable degree of drag reduction. Such polymers are susceptible of shear degradation thereby precluding use of severe agitation during mixing with the liquid solvent to increase solubility rates. Additionally, the relatively high viscosity of these additives impedes the hydration process as high viscosity materials are difficult to disperse uniformly in the liquid solvent.

In accordance with this invention a continuous mixing system and technique is provided wherein the soluble polymeric drag-reducing additive is rapidly mixed with a liquid solvent and the hydration made to proceed before injection into the boundary layer for a time period sufficient to dissolve a substantial portion of the polymer contained in the mixture. The invention has particular application in systems in which the liquid is water, and the additive is a water-soluble high molecular weight linear viscoelastic polymer such as polyethylene oxide, in the form of a dispersion of particles of small grain size. The percent of polymer of the mixture in solution is a function of time after introduction of a quantity of polymer into a quantity of water. The rate of dissolving the polymer is initially high and thereafter decreases at an increasing rate. Accordingly, a graph of percent polymer in solution as ordinate and time as abscissa with logarithmic scales used on both coordinates has a steep initial portion corresponding to a rapid dissolution and extending over a short period of time, a rounding intermediate portion corresponding to an intermediate rate of dissolution and extending over an intermediate period of time, and a small slope final portion which approaches the 100 percent dissolution line or complete solution substantially asymptotically, corresponding to a slow rate of dissolution. A normalized graph, using a logarithmic scale along both the ordinate and abscissa, or the relationship between percent of polymer in solution and time, such as described above is shown in FIG. 4, in which percent of polymer in solution represented by the expression $$1 - \left(1 - \frac{kt}{a\rho}\right)^3$$

is plotted as a function of $kt/a\rho$, wherein
  $k$ represents solubility or hydration rate expressed in terms of mass per time per surface of the aggregate mass,
  $t$ represents time,
  $a$ represents the initial radius of a grain, and
  $\rho$ represents the initial density of the granular polymer mass.

Constant solubility or hydration rate $k$ is assumed. Uniform grain size is also assumed. The normalized graph is in agreement with empirical data. As an example, Polyox Coagulant, a grade of polyethylene oxide made by Union Carbide Co. of New York, New York with sifted grain sizes smaller than 200 mesh (0.0029 inch in diameter) was found to be effectively 60 percent in solution in 12 seconds. By "a substantial portion of the polymer contained in the mixture" is meant percentages of polymer falling within the intermediate portion of the aforedescribed graph, or approximately 30 to 95 percent. Time of hydration or dissolution of a substantial portion of the polymer contained in the mixture has been found not to be materially changed by concentration level of the additive in solution. Higher concentrations of additive needed in the injected solution, for example, in the range of 1 to 2 percent, can be prepared by this technique and then diluted since it has been found that dilution time is substantially less than the time required for hydration provided the solution is represented by a point on the intermediate point of the aforementioned graph. It has been found that with solutions close to 100 percent point, i.e., solutions having hydration time in the order of one-half to 2 hours, on the graph or virtually complete solutions that dilution time is substantially greater than the hydration time particularly when such 100 percent solution points represent solutions close to saturation. It is believed that the reason for the substantial increase in dilution time when a solution of the long chained polymers is allowed to stand for a while is due to the fact that the long chains become entangled and consequently untangling and uniform distribution in a larger body of solvent takes a very long time even with agitation.

A higher concentration of the additive can also be prepared and injected directly into the boundary layer with dilution allowed to occur in the boundary layer instead of prior to injection. As mentioned above, it is important that such solution be a solution represented by a point on the intermediate portion of the aforementioned graph. A solution of polyethylene oxide of high molecular weight which has been allowed to dissolve for 12 seconds until approximately 60 percent is in solution will dilute in a short enough time to be effective for most applications. Generally, solutions in the 20–60 percent yield range are achieved in a short enough time period and dilute in a much shorter period of time to render them suitable for most applications. It is believed that solutions in the range of 90 to 95 percent yield and also for hydration periods up to the order of a few minutes, for example, 5 minutes, that dilution time is still much shorter than hydration time. However, a solution which has been allowed to stand for an hour in which virtually 100 percent of the polymer is in solution will not dilute in a short enough time to be effective.

It has been found that effective use can be made of the polymer by preparation and direct injection of solutions greater than optimum allowing dilution to take place in the boundary layer as the injected solution moves therein. Of course, the hydration time allowable and hence the dilution time are determined by the particular application wherein drag reduction is to be applied. For most marine systems, the time that the polymer transits in the boundary layer flow will be small with respect to the time required for hydration. Hence, dilution must be relatively rapid to allow the injection of highly concentrated solutions.

Another modification of the technique of the invention employs a premixture of the additive in a neutral density nonsolvent fluid dispersion and thereafter mixes said dispersion rapidly with a solvent to provide the final product with a minimum of shear degradation for the polymeric material. Hydration of the polymeric material proceeds smoothly upon dispersion in the liquid solvent. In the foregoing embodiments an advantage is gained of requiring less hydration volume capacity in the system for a given flow rate of the drag-reducing composition than would be needed if the composition were prepared directly by mixing polymeric material with solvent and allowing sufficient time for the hydration to take place. Also advantage is obtained through the use of neutral density dispersion liquid since this minimizes or eliminates the need for thickening agents, the high viscosity of which would impede proper dispersion. Additional and significant advantage is obtained by preparing the premixture with polymer of small grain size. This reduces the time, and hence tankage required, to hydrate the polymer into an effective solution.

In carrying out the practice of this invention in one embodiment a method and apparatus has been devised which ingests ambient liquid, pumps the liquid as a high-pressured jet into a mixing chamber, forces a polymeric additive which may be a finely divided solid polymer or a liquid suspension of such polymer into the jet and thoroughly mixes the polymeric additive with the liquid. From the mixing chamber the partially mixed solution passes into a hydration chamber where the polymer is substantially dissolved in accordance with the requirements specified above to provide an effective drag-reducing composition solution. The polymer solution which has been fully developed to provide the desired drag-reducing properties during passage through the mixer system can also be diluted with bypassed ambient fluid to realize a lower concentration before injection and thereby greatly diminish the hydration tank volume. Although the apparatus is discussed principally in regard to the preparation of additives such as water-soluble drag-reducing viscoelastic polymers to be used in water for the purpose of drag reduction it is to be appreciated that this apparatus may be used for the mixing of nonaqueous polymer materials, for example, polyisobutylene or high molecular weight liquid silicones may be mixed with kerosene or other aircraft fuels to increase the line capacity in midair refueling and thus shorten the time of exposure to danger.

These and other objects, features and advantages of the present invention will become apparent upon careful consideration of the following detailed description when considered in connection with the accompanying drawings which illustrate a preferred embodiment of the present invention.

Figure 1:
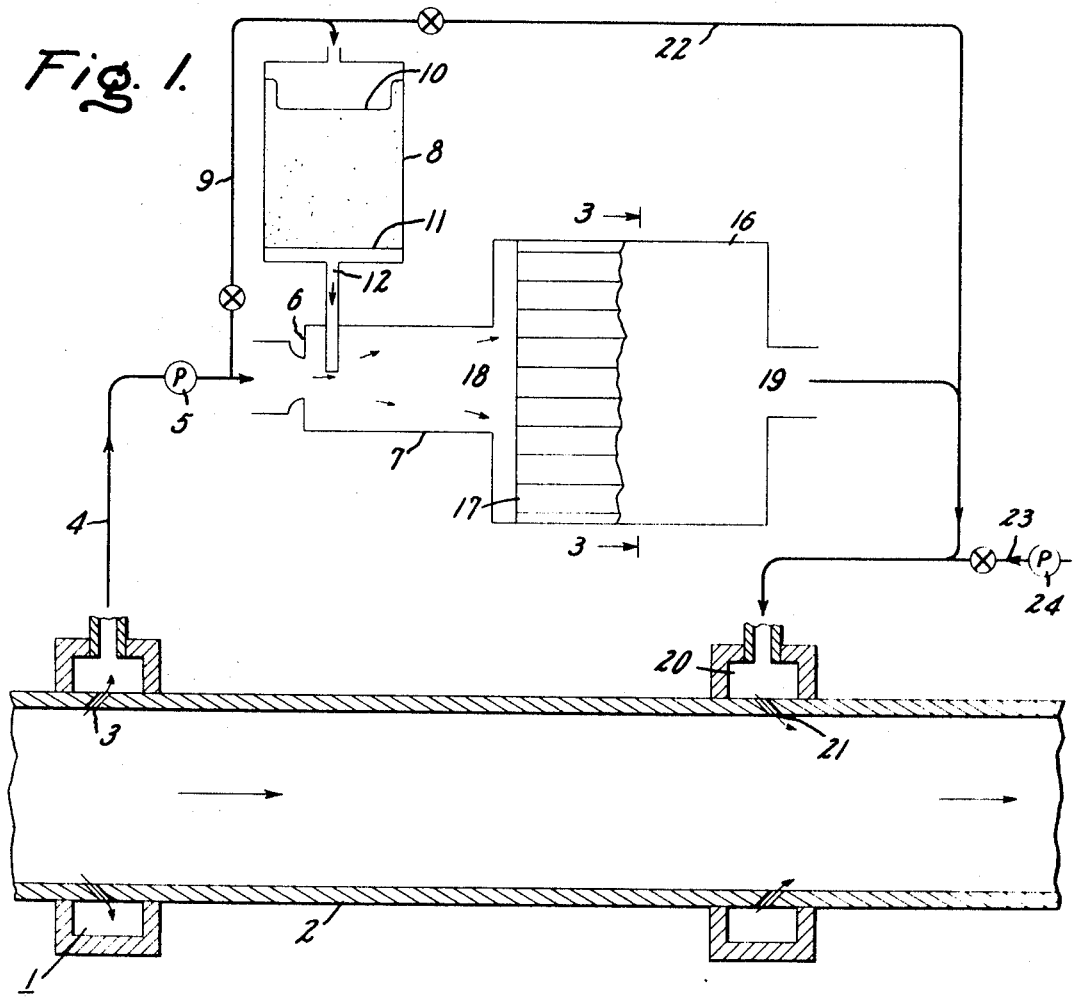
FIG. 1 is a diagrammatic or schematic illustration of the invention.

The embodiment shown in FIG. 1 is a system for mixing polymer additives with liquid and injecting the mixture at a point upstream or downstream of the intake manifold 1. As shown in FIG. 1, this mixing system is applied to a pipe line, however, it is readily apparent that the mixing system could be applied at any place where liquid flows by a solid surface such as a side of a vessel or vehicle, for example, as shown in the patents listed above.

In the embodiment shown in FIG. 1, an intake manifold is placed about conduit 2 and water is taken in the intake manifold through a circumferential slot 3 in the conduit wall. This water is collected into a pipe 4; high-pressure pump 5 boosts the pressure; the water is passed through a tube into jet orifice 6 in the wall of mixing chamber 7; and the water jets out into the mixing chamber diverging as it flows forward.

Storage tank 8 holds polymeric material which is suspended in a neutral density solution having about the same specific gravity as polymer and which is unreactive with the polymer. An example of such a solution is a neutral density solution made of ethylene glycol with added lead acetate or zinc iodide. The specific gravity of the ethylene glycol is less than that of the added polymer. An additional system is a combination of glycerol and alcohol. Thus, to obtain a solution of the desired specific gravity a suitable amount of lead acetate, for example, is added until the solution has reached a correct specific gravity to suspend the particular polymer being used. In this way polymeric additive can be stored indefinitely and be ready for use at any time.

A portion of the water in pipe 4 passes to storage tank 8 through conduit 9 where it provides pressure above the diaphragm 10 so that when operation is started in the system the suspended polymer below diaphragm 10 ruptures member 11 and passes through small tube 12 to mix drop by drop into the flowing water at about the middle of the jet. The jet is allowed to expand and produce a high degree of turbulent mixing between the water and polymer.

Figure 2:
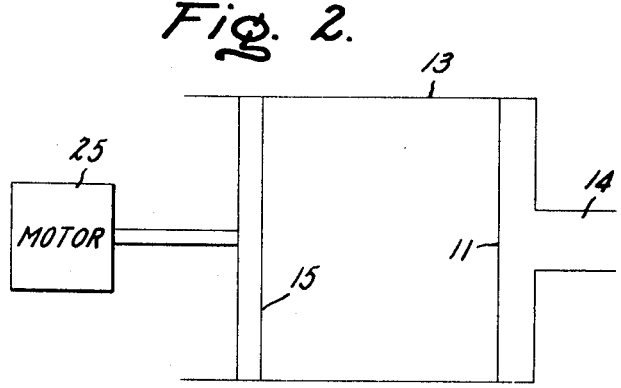
FIG. 2 shows an alternative embodiment of the polymer suspension tank used in the FIG. 1 embodiment.

Alternately, the FIG. 2 embodiment depicts a polymer suspension storage tank 13 which has a small outlet 14 on one side and piston 15 on the wall of the other side. A rupturable member 11 is stretched across the outlet side of the tank to keep the liquid suspension from contact with the water when the polymeric injection system is not in use. Alternatively, a hand or solenoid operated valve could similarly be used. When the system is in use the membrane ruptures under the force of pressure of the liquid suspension and passes from the tank into the mixer system.

Regardless of which above option is used, once the high pressure water and polymer have been mixed in mixing chamber 7 (FIG. 1) the mixture passes into a hydration tank 16 having cellular or honeycomb partitions wherein the finely divided polymer has ample time for hydration with the water. Because the polymer is finely divided and is thoroughly mixed with the water at the jet orifice the hydration time is greatly reduced and hydration is fully accomplished in the relatively small hydration tank.

Tank size is also reduced by the structure of the hydration tank 16 which has a honeycomb or similar structure 17 extending from near one end to near the other end of the tank. Polymer and water pass through the honeycomb structure 17 where they are subjected to shear, causing thorough and rapid mixing of these substances. The impedance of each cell of the honeycomb is uniform so that the flow is fairly evenly spread across the tank, and the time of passage through the tank for each particle of water is about the same. This avoids stratification so that the flow does not transit in a straight line from entrance 18 to exit 19 as would be the case if there were no honeycomb structure. Maximum utilization of the tank volume is obtained by this arrangement. The hydrated solution is then diluted with bypass flow by way of line 22 to the appropriate injection concentration or can be directly injected. This procedure of mixing to a high concentration in the hydration tank greatly reduces the volume thereof while still allowing the realization of effective solutions. The hydrated polymer under moderate pressure passes into an injection manifold 20 then to slot 21 leading to the interface between the solid surface and the water moving relative to the solid surface. The introduction of hydrated polymer at this interface allows the polymer to flow along the wall of the solid and the water flows past the coated interface with much less turbulence and less power is required to move a given amount of liquid passed a point on the solid surface than would be the case if no polymer had been added. Reviewing the situation from another way, a given amount of power forces a larger amount of liquid passed a given point on the solid surface when a polymer coating is added.

The size of the hydration tank 16 may be significantly further reduced for efficient hydration by the use of bypass system 22. Here only a small portion of water is passed directly through the nozzle mixer-hydration tank system. This results in significantly higher percentage yields of polymer in solution. In this case the concentration of additive-water coming out of tank 16 is higher than needed for efficient utilization at the water-solid interface and these higher concentrations are then diluted with the bypass flow prior to actual injection and use. This bypass-mixer arrangement is of major importance in determining the size of the mixer system since dilution can be accomplished in less than a tenth of the time necessary for hydration. Corresponding hydration tank size reduction is then realized with the same polymer yields as in the case where the entire flow is passed through the mixer and hydration tank.

The hydrated polymer which has been injected and used can be reused by providing an intake manifold downstream of the injection manifold and drawing off a large portion of the hydrated polymer as shown in U.S. Pat. No. 3,308,310 previously mentioned, recirculating it upstream through conduit 23 and pump 24 and adding fresh polymer prior to reinjection. This is viewed as an alternative method where a long run is expected and recirculation opportunity is afforded with consequent savings of polymer. If hydrated polymeric additive is recovered downstream and is thereafter recirculated for reinjection, the concentrated polymer additive from the hydration tank may be added directly to recovered and somewhat diluted additive and the mixture injected through injection manifold 20 and injection slot 21. If the recirculated additive and concentrated additive when mixed together produce too high a concentration, water may be metered in through the bypass 22 until a suitable concentration is produced.

The operation of the system of FIG. 1 is applied to a pipe containing water essentially as follows. A polymer having high molecular weight and linearly chained molecules is suspended in a nonreactive liquid of neutral density and forced drop by drop into a water jet under pressure. Polymer and water swirl about in mixing container and pass into a hydration tank where hydration is effectively completed and a uniform polymer solution formed of the entering mixture. After exit from the hydration tank the polymer solution is injected into the boundary layer between the water and the solid surface by which it flows. The hydrated polymer may be directly fed into the boundary layer or may be added to another polymer which has been recovered from the boundary layer downstream and is now being recirculated and reintroduced on the boundary layer between the water and solid surfaces. The size of the hydration tank may be reduced, if one wishes, by passing only a small portion of the water through the jet, mixing chamber and hydration tank and diverting the rest of the water around them to be mixed with the concentrated hydrated polymeric additive between the hydration tank and the point of injection.

The merit of direct injection of polymeric solution into the boundary layer and allowing dilution to take place therein will be appreciated from a particular example. A water tunnel facility comprising flow in the entry region of a pipe 1¼ inch in diameter to stimulate a developing vehicle boundary layer was provided with leading edge injection of a 20 percent slurry of Polyox Coagulant in glycerol and alcohol. As mentioned above, Polyox Coagulant is a grade of polyethylene oxide made by the Union Carbide Co. having a molecular weight of approximately $5 \times 10^6$. An injection flow rate of 0.25 gallons per minute per peripheral inch with an input concentration of 5,000 parts per million of polyethylene oxide was provided. The polymer was hydrated for approximately 10 seconds before injection at the leading edge of the pipe to yield a 0.2 percent solution, that is a solution of approximately 2,000 parts per million of polyethylene oxide. The friction factor for the system was $5.17 \times 10^{13}$ (four times wall shear stress divided by kinetic head) and the Reynolds number was determined to be $4.08 \times 10^5$ (average velocity times diameter divided by kinematic viscosity). Such friction factor was approximately the same as obtained with an injection rate of 1.5 gallons per minute per peripheral inch of 600 parts per million of fully hydrated Polyox Coagulant. Accordingly, injection of concentrated, partly hydrated, solution directly into the boundary layer as compared with injection of a lower concentration of hydrated solution of 600 parts per million of polyethylene oxide indicates a 6-to-1 reduction in flow rate with a 1.8-to-1 reduction in polymer consumption. Accordingly, a significant reduction in flow requirement is achieved with the result that only a small capacity pump for polymer mixing is needed and a saving in polymer material is achieved for a given level of performance.

The alternate embodiment of the storage tank shown in FIG. 2 has a motor 25 for moving piston 15 in the cylindrical tank 13. The motor 25 may be started by the same switch (not shown) that controls the jet pump. Starting the pump and motor causes water to be circulated under high pressure to form a high-velocity jet at orifice 6. The polymer suspension is injected into the water jet through pipe 12 when the motor 25 operates and moves the piston. The operation of the overall system using this embodiment is the same as described above with respect to FIG. 1.

Figure 3:
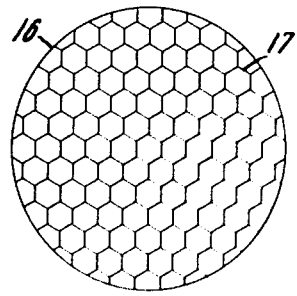
FIG. 3 shows a cross section taken along the line 3—3 of FIG. 1.
Figure 4:
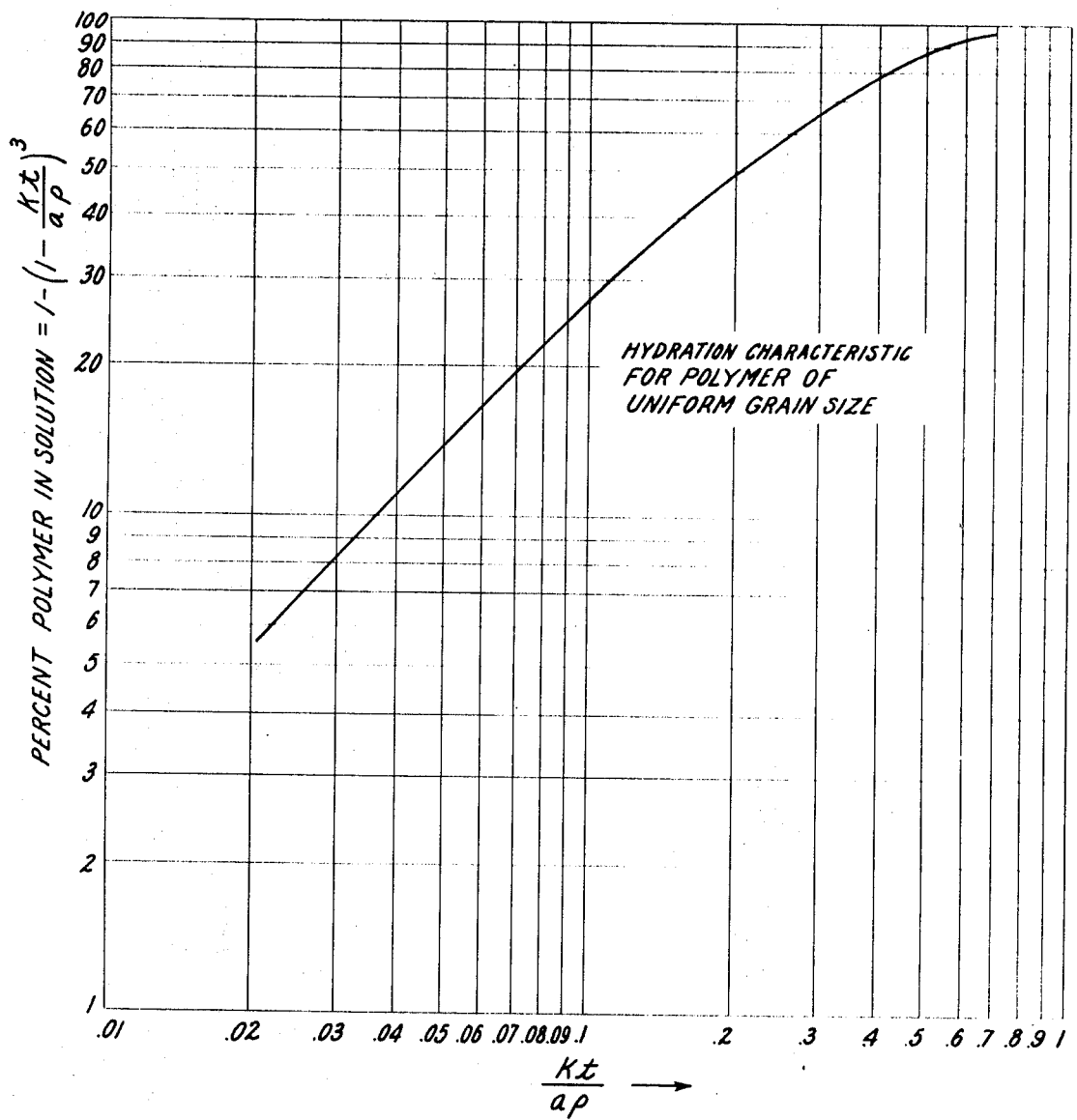
FIG. 4 is a normalized graph using a logarithmic scale along both the ordinate and abscissa to demonstrate the relationship of the percent of polymer in solution as a function of time.

The hydration tank 16 has a honeycomb 17 as shown in FIG. 3 mounted in its filling the tank so that all the liquid passing through the tank is affected by passing through the honeycomb as explained above. honeycomb 17 should be of such fineness as to prevent stratification or channeling of the solution and allow continued mixing and hydration of the particular polymer in the water solution.

The term "additive or polymer material" as used in this specification is intended to include all polymers or additives having the property of drag reduction when mixed with a liquid and the term "hydrated polymer" is intended to include all such additives which have been dissolved in a liquid for a sufficient time to develop a substantial degree of their drag-reducing properties. Likewise, "hydration" is intended to include solutions of nonaqueous polymer materials, such as polyisobutylene, in a liquid solvent therefor, such as kerosene or other aircraft fuels, for a sufficient time period to fully develop the drag-reducing properties.

In its broadest sense, therefore, the present invention provides a method and system to continuously treat a soluble polymer material with a solvent in order to produce a solution having improved friction reduction capability. A finely divided soluble polymer can be used as the starting active material in the practice of the present invention by introducing either a liquid or dry suspension of said material into the mixing chamber for rapid mixing with the solvent. Conventional techniques can be used to obtain the aforementioned premix of the polymer for introduction into the mixing chamber in order to increase the speed of mixing with a solvent. It is not intended to limit the invention, therefore, to the scope of the preferred embodiments above described since it will be apparent that various modifications are possible within the scope of the appended claims.

What we claim as new and desire to secure by Letters Patent of the United States is:

1. An apparatus for applying drag-reducing additives comprising a mixing chamber to rapidly form a suspension of a soluble polymeric material in a solvent, means for hydrating the suspension as formed during a first time period whereby only a partial solution of the polymer has been produced having a higher concentration than is needed for drag reduction, and means to inject the partial solution as formed into a boundary layer at a flow rate sufficient to accomplish drag reduction including means to dilute the partial solution prior to ejecting said partial solution into said boundary layer.

2. An apparatus for applying drag-reducing additives comprising a mixing chamber to rapidly form a suspension of soluble polymeric material in a solvent and which mixing chamber includes means to contact the polymeric material with a stream of the solvent and hydration proceeds during passage of the suspension to a solid surface which is to be lubricated by drag-reducing additives, means for hydrating the suspension as formed until a solution of a substantial portion of the polymer has been produced to form a more concentrated solution that is needed for drag reduction, wherein the hydration means comprises a second chamber connected to the mixing chamber and the means for injecting the solution as formed into a boundary layer are connected to the second chamber, and means to inject the solution as formed into the boundary layer at a flow rate sufficient to accomplish drag reduction which includes means to dilute the solution connected between the second chamber and the means for injecting the solution as formed into the boundary layer.

3. An apparatus for applying drag-reducing additives comprising a mixing chamber to rapidly form a suspension of a soluble polymeric material in a solvent and which mixing chamber includes means to contact the polymeric material with a stream of the solvent and hydration proceeds during passage of the suspension to a solid surface which is to be lubricated by drag-reducing additives wherein the solvent stream is ambient liquid provided from an opening in the surface to be lubricated by drag-reducing additives, means for hydrating the suspension as formed until a solution of a substantial portion of the polymer has been produced to form a more concentrated solution than is needed for drag reduction and wherein a portion of the solvent stream bypasses the mixing chamber and dilutes the solution formed upon hydration, and means to inject the solution as formed into a boundary layer at a flow rate sufficient to accomplish drag reduction.

4. An apparatus for applying drag-reducing additives comprising a mixing chamber to rapidly form a suspension of soluble polymeric material in a solvent and which mixing chamber includes means to contact the polymeric material with a stream of the solvent and hydration proceeds during passage of the suspension to a solid surface which is to be lubricated by drag-reducing additives, means for hydrating the suspension as formed until a solution of a substantial portion of the polymer has been produced to form a more concentrated solution than is needed for drag reduction wherein the hydration means comprises a second chamber connected to the mixing chamber and the means for injecting the solution as formed into a boundary layer are connected to the second chamber, and means to inject the solution as a substantial the boundary layer at a flow rate sufficient to accomplish drag reduction which includes means to dilute the solution is connected between the second chamber and the means for injecting the solution as formed into the boundary layer and receives ambient liquid from an opening in the surface to be lubricated by drag reduction.

5. An apparatus for applying drag-reducing additives comprising a mixing chamber to rapidly form a suspension of a soluble polymeric material in a solvent and further including means to supply a neutral density dispersion of a solid soluble polymer in a nonsolvent liquid, means for hydrating the suspension as formed until a solution of a substantial portion of the polymer has been produced to form a more concentrated solution than is needed for drag reduction, and means to inject the solution as formed into a boundary layer at a flow rate sufficient to accomplish drag reduction.

6. A method for applying a drag-reducing additive which comprises mixing soluble polymeric material with liquid solvent to form rapidly a liquid suspension, hydrating said suspension as formed until a substantial portion of sad polymeric material has been dissolved to form a more concentrated solution than is needed for drag reduction, and injecting the solution as formed into a boundary layer at a flow rate sufficient to accomplish drag reduction in which the polymer solution is diluted prior to injection into the boundary layer.

7. A method for applying a drag-reducing additive which comprises mixing soluble polymeric material with liquid solvent to form rapidly a liquid suspension wherein the polymeric material is a neutral density dispersion of solid polymeric particles in a nonsolvent liquid, hydrating said suspension as formed until substantial sustantial portion of said solid polymeric particles have been dissolved to form a more concentrated solution than is needed for drag reduction, and injecting the solution as formed into a boundary layer at a flow rate sufficient to accomplish drag reduction.

UNITED STATES PATENT OFFICE
CERTIFICATE OF CORRECTION

Patent No. 3,601,079        Dated August 24, 1971

Inventor(s) Walter B. Giles and William T. Pettit, III

It is certified that error appears in the above-identified patent and that said Letters Patent are hereby corrected as shown below:

Claim 4, column 8, line 16, delete "a substantial" and insert

- formed into -

Claim 7, column 8, line 53, delete "sustan-"; line 54, delete "tial"

Signed and sealed this 11th day of January 1972.

(SEAL)
Attest:

EDWARD M. FLETCHER, JR.        ROBERT GOTTSCHALK
Attesting Officer        Acting Commissioner of Patents